Sept. 22, 1964      W. G. PFANN      3,150,341

PIEZORESISTIVE STRESS TRANSDUCERS

Filed April 25, 1961

INVENTOR
W. G. PFANN
BY
ATTORNEY

United States Patent Office 3,150,341
Patented Sept. 22, 1964

3,150,341
PIEZORESISTIVE STRESS TRANSDUCERS
William G. Pfann, Far Hills, N.J., assignor to Bell Telephone Laboratories, Incorporated, New York, N.Y., a corporation of New York
Filed Apr. 25, 1961, Ser. No. 105,356
3 Claims. (Cl. 338—2)

This invention relates to stress gages and more particularly to semiconductor piezoresistive gages having a prescribed construction and operation which provide new and unexpected stress gage functions.

It has been the practice in the art of semiconductor piezoresistive stress or strain gage construction to seek wherever possible the largest piezoresistive coefficient obtainable in a given piezoresistive material thus obtaining the highest piezoresistive strain sensitivity. Piezoresistive materials characteristically provide this most advantageous coefficient in one particular crystallographic orientation of the crystal. Typically this most advantageous orientation utilizes the longitudinal piezoresistive coefficient of the material. Heretofore the transverse piezoresistive coefficient has been ignored primarily since its magnitude is generally substantially less than the longitudinal coefficient.

It has now been found that certain crystallographic orientations exist for particular materials which provide highly desirable critical relationships between the transverse coefficients. The utilization of such orientations, in combination with a piezoresistive measurement in a direction which is essentially normal to the plane of the applied stresses, provides new and unexpected functions in stress transducers.

The need has been recognized for a stress gage which records the sum of the principal biaxial stresses at the surface of a medium but which is independent of the orientation of the gage with respect to the directions of principal stresses in the medium. Using conventional gages great care must be taken to properly align the gage so that the piezoresistive effect in the gage is responsive to the principal directional stress. Where the stress direction is not known, as is often the case, multiple measurements in different alignments over the medium must be obtained to insure the proper reading. Using the principles of this invention as applied to stress measuring techniques, the sum of the principal stresses in a medium can be determined with a single measurement in a random direction. This random measurement is completely independent of the direction of the principal stress in the member.

The present invention teaches a gage construction which provides sensitive piezoresistive measurements with unexpected advantages and simplicity. This gage form is essentially a thin wafer of semiconductor carrying one electrical lead. The piezoresistive measurement is made through the thickness of the semiconductor wafer. This gage construction requires only one electrical contact affixed to the semiconductor body and permits the gage to be attached to the test medium being measured by a conducting or non-insulating adhesive such as solder. In this form a gage attached to a conductive medium utilizes the medium as a conductor for the test current and the second electrical lead can contact any conventional point on the medium being tested.

Various aspects of this gage construction may perhaps be more easily understood when considered in conjunction with the drawing in which.

Figure 2A:
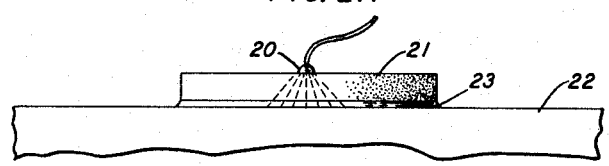
FIG. 2A is a schematic representation of the current flow characteristics in one form of gage design showing the undesirable current path resulting from the use of an electrode having a small contact area relative to the gage thickness.
Figure 2B:
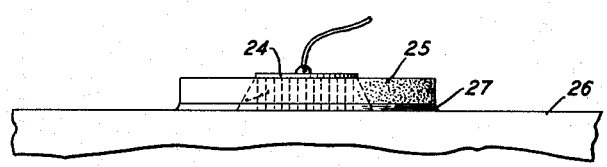
Figure 3:
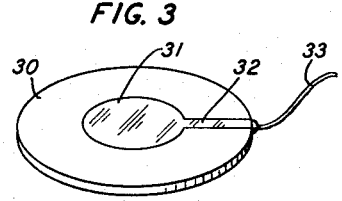

FIG. 2B is a schematic representation similar to FIG. 2A showing a desirable contact area with the attendant proper current flow characteristics; and FIG. 3 is a perspective illustration of an electrode adapted to be inserted between the semiconductor wafer and the member being tested to accommodate the test current through the thickness of the wafer in those applications where it is desired to avoid using the member as an electrode.

Figure 1:
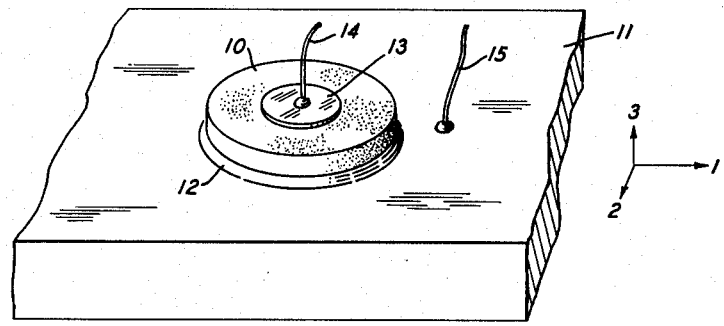
FIG. 1 is a perspective view of a gage constructed according to the teachings of this invention showing the gage affixed to a conductive member in which strains are to be measured.

FIG. 1 shows a semiconductor wafer 10 affixed to the member 11 in which strains are to be measured. The adhesive 12 is a conducting medium, for instance, a hard solder. Contact 13 is alloyed to the top face of the wafer as shown and lead 14 is attached to the contact. The remaining lead 15 contacts the base medium 11 at any desired point. These are connected to a conventional bridge circuit (not shown) capable of measuring the piezoresistive response of the semiconductor to stresses in the medium 11.

In this device biaxial strains in the medium 11 are accurately detected by the gage irrespective of the orientation of the wafer 10 to the medium 11 by utilizing the transverse piezoresistive coefficient. A discussion of this coefficient and various gage forms utilizing the transverse piezoresistive effect will be found in application Serial No. 96,463, filed March 17, 1961, and an application by W. G. Pfann and R. N. Thurston filed concurrently herewith (Pfann-Thurston 60–7). In the event that a nonconducting medium is being analyzed, a conductive spacer may be interposed between the gage and the medium and the lead 15 is attached to the conductive spacer.

For cubic semiconductors the specific crystallographic directions in the semiconductor for a piezoresistive measurement normal to the plane of the principal stresses which will provide the same gage reading irrespective of the principal strain directions are <001> and <111>. The direction of piezoresistive measurement is the direction designated "3" in FIG. 1 and is the measurement which this gage construction is adapted to provide.

The sum of the principal stresses can be calculated from the following equations, Equation 1 is for the <001> direction of piezoresistive measurement and Equation 2 is for the <111> direction of piezoresistive measurement:

$$\frac{\Delta \rho}{\rho} = (\sigma_a + \sigma_b)\pi_{12} \qquad (1)$$

$$\frac{\Delta \rho}{\rho} = \frac{(\sigma_a + \sigma_b)}{3}(\pi_{11} + 2\pi_{12} - \pi_{44}) \qquad (2)$$

where $\Delta\rho = \rho - \rho_0$ and is the measured piezoresistance variation ($\rho_0$ is the zero stress resistance), $(\sigma_a + \sigma_b)$ is the sum of the principal stresses, and $\pi_{11}$, $\pi_{12}$, and $\pi_{44}$ are the fundamental piezoresistive coefficients of the semiconductor. Typical values of these fundamental coefficients are given in the following table:

TABLE I

Approximate Piezoresistance Coefficients at Room Temperature

| Material | Resistivity (ohm-cm.) | $\pi_{11}$ | $\pi_{12}$ | $\pi_{44}$ |
|---|---|---|---|---|
| | | (10⁻¹² cm.²/dyne) | | |
| n-Ge | ~1 | (1) | (1) | −138 |
| p-Ge | ~1 | (1) | (1) | +97 |
| n-Si | ~12 | −102 | +53 | (1) |
| p-Si | ~8 | (1) | (1) | +138 |

[1] Essentially zero.

Since in these gage forms the piezoresistive measurement depends on the transverse piezoresistive effect, the current flow path must be essentially transverse to the plane of the biaxial strains. FIGS. 2A and 2B illustrate schematically the problem of obtaining transverse current flow. In FIG. 2A the electrical contact 20 is small compared with the thickness of the semiconductor body 21. As indicated the predominant current flow to the conductive base 22 is not in the desired perpendicular direction and the spreading of current results in a less sensitive and inaccurate piezoresistive measurement. In contrast to this, FIG. 2B schematically shows the current flow obtained when the contact area 24 is relatively large as compared with the semiconductor body 25. Here the current flow to the conductive base 26 is predominantly perpendicular and an accurate measurement of the transverse piezoresistive effect can thus be obtained. In each case the adhesive 23 and 27 should be at least as conductive as the semiconductor bodies 22 and 26.

Accordingly, where the base or body to which the gage is affixed is utilized as a conductor for the test current, without further precautions to insure the desired current flow, the diameter (or width) of the contact should preferably be at least twice the thickness of the semiconductor body.

As previously pointed out a conductive spacer may be utilized between the gage and the body being measured in which event the test current passes through the semiconductor body and the spacer. In this form the precaution indicated by FIGS. 2A and 2B must be followed. However, the spacer may be constructed as shown in FIG. 3 in which case the current flow lines will necessarily be restricted to the desired flow path.

FIG. 3 shows a spacer designed to eliminate excessive current spreading and insure a proper current flow path. The spacer 30 is an insulating material with respect to the semiconductor gage material but includes a conductive portion 31, which is soldered to the semiconducting wafer, and a narrow conducting path 32 connecting the conductive portion 31 with the external lead 33. This spacer is adapted to be inserted between the gage and the test body and, if the area and geometry of the conductive portion 31 is essentially a vertical projection of the contact area of the electrode (e.g. 13 of FIG. 1), then vertical or transverse current flow lines will be insured. In order to preserve the faithful transfer of stresses from the test body to the gage material, this spacer 30 should be as thin as possible. It is apparent that, wherever possible, operation without such a spacer will be both more convenient and economical.

It should be appreciated that while the gage form has assumed a disc shape for the purposes of this discussion, the actual size and geometry of the semiconductor body is not of consequence. Since the piezoresistive measment is through the thickness of the body of the gage, only such size as will accommodate this measurement is required. However, where the gage body is very small compared to the size of the electrode, edge effects become troublesome. Accordingly, in general, the minimum dimension of the gage body as measured in the plane of the gage, should preferably be at least twice the corresponding minimum dimension of the electrode.

In all gage constructions where the gage is glued or otherwise affixed to a medium being tested, care must be taken to insure a faithful translation of the stresses in the medium to the piezoresistive test body. To this end the gage bodies of this invention preferably have a minimum planar dimension of ten times the gage thickness.

The term "wafer" used in this specification and in the appended claims is intended to define a thin, planar body of any desired shape and accordingly, should not be construed as prescribing any shape or form to the planar cross section.

It is understood that this invention relies on the limitation, among others, that the piezoresistive measurement is made transverse to the plane of the semiconductor wafer, i.e., through its thickness. However, all such measurements which deviate from this otherwise exact limitation and still provide a piezoresistive response of the character indicated herein are properly considered within the scope of the language of the appended claims designating the direction of piezoresistive measurement as "approximately normal" to the plane of the applied stresses.

Various other modifications and embodiments of the gage forms described herein will become apparent to those skilled in the art. All such variations and deviations, which basically rely on the teachings by which this invention has advanced the art, are properly considered to be within the scope of this invention.

What is claimed is:

1. A piezoresistive semiconductor stress gage comprising in combination, a test body in which strains are desired to be measured, a flat single crystal, piezoresistive, semiconductor wafer having a cubic crystal structure, said wafer affixed to the surface of said test body with its planar dimension parallel to the surface of the test body, means including electrical contacts for measuring electrical resistance variations through the thickness of said wafer and in a $<111>$ crystallographic direction.

2. The device of claim 1 wherein the said test body is conductive and the means for measuring resistance variations include one electrode contacting the test body.

3. The device of claim 1 wherein the piezoresistive semiconductor body consist of a material selected from the group consisting of germanium and silicon.

References Cited in the file of this patent
UNITED STATES PATENTS

| 2,249,933 | Beckmann | July 22, 1941 |
| 2,373,160 | Bollman et al. | Apr. 10, 1945 |
| 2,554,324 | Chambers | May 22, 1951 |
| 2,558,563 | Janssen | June 26, 1951 |
| 2,614,144 | Howatt | Oct. 14, 1952 |
| 2,789,068 | Maserjian | Apr. 16, 1957 |

OTHER REFERENCES

Smith's "Piezoresistance Effect in Germanium and Silicon," Physical Review, vol. 94, No. 1, April 1, 1954, pages 42–49.